United States Patent [19]

Lyon

[11] Patent Number: 5,094,549
[45] Date of Patent: Mar. 10, 1992

[54] LINEAR ROLLER BEARING ASSEMBLY

[75] Inventor: Gregory S. Lyon, Manorhaven, N.Y.

[73] Assignee: Thomson Industries, Inc., Port Washington, N.Y.

[21] Appl. No.: 544,211

[22] Filed: Jun. 26, 1990

[51] Int. Cl.⁵ ............................................. F16C 29/06
[52] U.S. Cl. ..................................................... 384/44
[58] Field of Search ..................... 384/44, 40, 43, 45; 464/168

[56] References Cited

U.S. PATENT DOCUMENTS

| | | |
|---|---|---|
| 3,190,703 | 6/1965 | Thomson et al. |
| 4,643,591 | 2/1987 | Schwarz ............................ 384/44 |
| 4,659,238 | 4/1987 | Teramachi ........................ 384/44 |
| 4,840,600 | 1/1989 | White et al. ...................... 384/44 |

Primary Examiner—Lenard A. Footland
Attorney, Agent, or Firm—Dilworth & Barrese

[57] ABSTRACT

A linear recirculating anti-friction bearing assembly is disclosed for movably supporting a workpiece on a support shaft in the form of a round way. The bearing includes a housing and an elongate inner roller race for supporting the work piece on the round way. A plurality of rollers are positioned within the housing and are recirculated between loaded positions between the inner race and the round way and unloaded positions through which the rollers are recirculated back to the loaded positions. The housing is configured to retain the rollers and includes roller retainer strips at the lower end portions adjacent the inner race to retain the rollers in position when supporting the housing on the round way and to retain lubricants within the housing. Additional dust/lubrication means are provided on the housing.

16 Claims, 7 Drawing Sheets

LINEAR ROLLER BEARING ASSEMBLY

BACKGROUND OF THE INVENTION

1. Field of the Invention

This invention relates to recirculating roller bearing assemblies, and more particularly to a linear recirculating roller bearing of the type including a plurality of rollers which are operable independent of each other and are contained in a raceway for rolling recirculating movement along parallel, spaced apart, load bearing and return surfaces.

2. Description of the Related Art

A typical chain-type, linear recirculating roller bearing assembly is disclosed in U.S. Pat. No. 3,190,703 to Thomson and Magee. The roller bearing assembly includes a shaft, numerous rolling elements, a raceway having a load bearing surface and an unloaded return surface, and means for redirection of the loaded rolling elements. The rolling elements are mounted on a chain and are free to rotate on the chain and to roll in the direction of axial displacement.

While the chain type roller bearing is highly effective, elimination of the need for the chain connecting links would provide a significant improvement for said bearing assemblies. For example, the expense associated with the chain manufacture would be eliminated. Thus, the special fixtures and tooling associated therewith would also be eliminated. Additionally, the ends of the carriage races require special spherical grinding to provide a path for the roller chain assembly, and as such would be eliminated.

Also, the chain assembly and rolling elements are open to the environment and require special seals to prevent the migration of contaminants into the bearing. Incorporation of a protective housing would provide a major advance for sealing and lubrication in bearings of this type.

I have invented a linear roller bearing of this type which satisfactorily eliminates the chain and permits the rollers to function independently of each other in an improved manner.

SUMMARY OF THE INVENTION

Accordingly, a feature of the present invention is the provision of a linear recirculating roller bearing assembly which eliminates the need for chain systems.

Another feature of the present invention is the provision of a bearing unit which is relatively simple and inexpensive to assemble and install, and which can be readily serviced at operating sites.

Another feature of the present invention is the provision of a self-contained roller-race unit which can be easily assembled and mounted on a shaft, and, which minimizes the entry of contaminants into the bearing unit while retaining lubricants therein.

These and other features are incorporated herein by providing a linear recirculating anti-friction bearing assembly which includes a roller-race unit which defines a path about which rollers continuously recirculate. A plurality of rollers are arranged along a path created by a bearing race and a retainer wall. A second retainer wall is secured to the first retainer wall so as to enclose the rollers around the bearing race, thus, forming a self-contained roller-race unit. The roller-race unit is mounted on a mounting member which is positioned over a bearing shaft. The rollers of the roller-race unit engage the surface of the bearing shaft. Means are provided on the retainer walls to retain the rollers in position when loaded between the inner race and a support shaft. Means is provided to adjust the height of the roller-race unit with respect to the mounting member to control the bearing pressure of the rollers on the bearing support shaft.

Thus, in accordance with the present invention, the roller-race unit eliminates the need for, and the expense related to, the manufacture and use of a chain assembly required in bearings of this type. The rollers are disposed in an enclosed roller-race unit and are free to circulate, independent of other rollers, around the path defined by the unit, while being self aligned with respect to the support shaft and the bearing race.

Additionally the parallel walls of the roller-race unit are designed to fit snugly on the bearing shaft thereby preventing dust and other contaminants from entering into the roller-raceway unit, while also containing necessary grease in the assembly.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
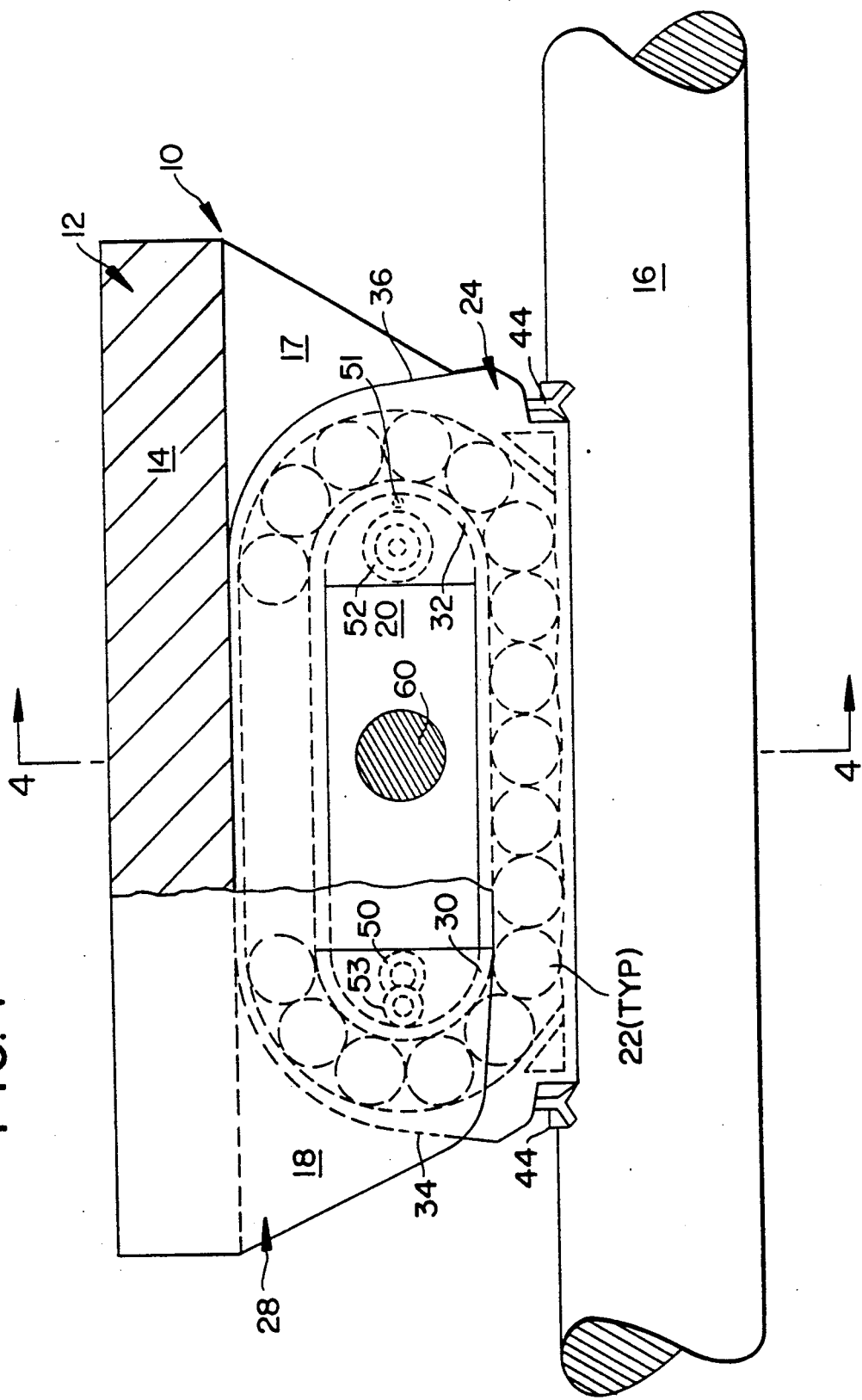
FIG. 1 is a side elevational view of the linear roller bearing assembly of the present invention partially cut away to illustrate the roller-race unit and the rollers therein.
Figure 2:
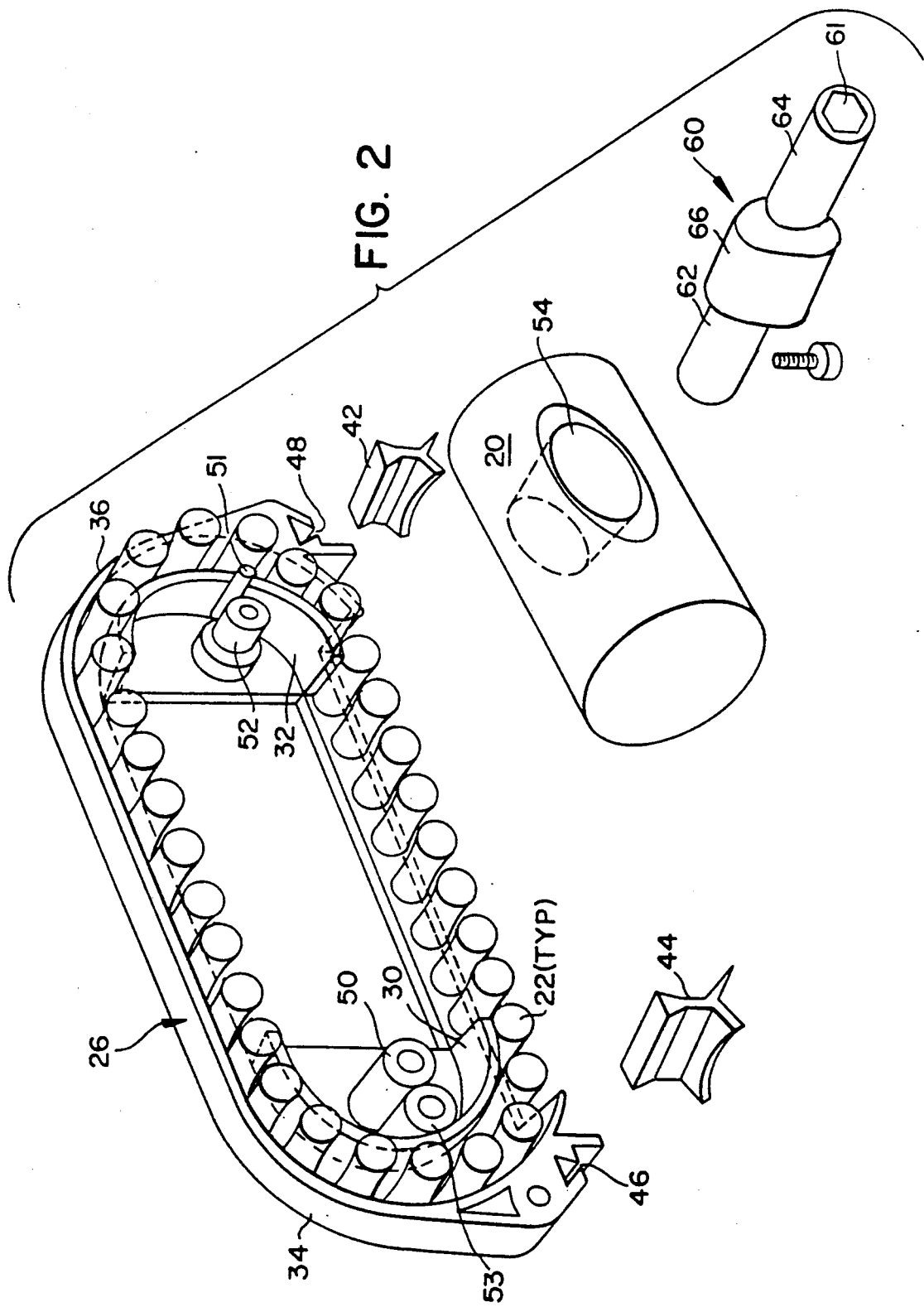
FIG. 2 is a perspective view, with parts cut away and separated for purposes of illustration, of the linear roller bearing of the present invention illustrating the positioning of the bearing race, the side walls, and the rollers.
Figure 3:
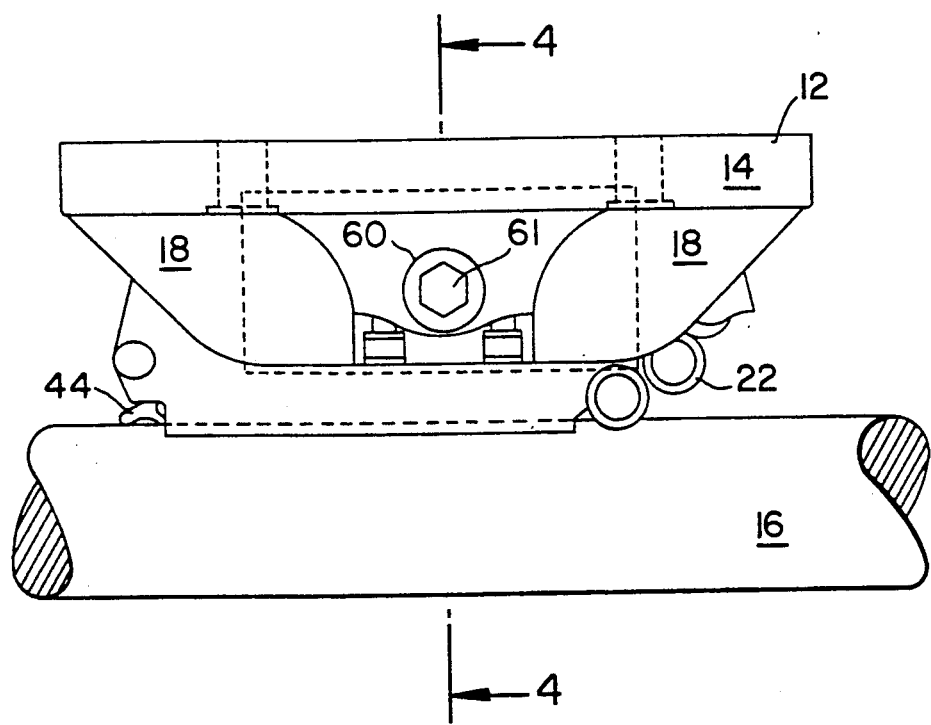
FIG. 3 is a side view of the linear roller bearing assembly of the present invention showing the rollers where a portion of the wall is cut away.

Referring initially to FIGS. 1–4 there is illustrated a linear recirculating anti-friction roller bearing 10 constructed according to the present invention. FIG. 2 shows the roller bearing assembly with one half section of the housing removed. A mounting member 12 is attached to a structure which is intended to be slidably moved axially along a support shaft 16 having a circular cross-section. The mounting member 12 includes a main support brace 14 and two downwardly depending side plates 17, 18 to which the race 20 is attached as will be disclosed hereinbelow.

Referring now to FIGS. 1 and 2 a roller bearing race 20 is of solid elongate construction having a circular cross-section as best shown in FIGS. 1 and 2. The bearing race 20 is positioned within housing 24 constructed of two opposed retainer half sections 26, 28 which are assembled by appropriate fasteners such as screws, bolts etc. The housing halves and seals are preferably molded of a strong engineering plastic material. Positioned within the housing is a plurality of concave rollers 22 as shown, which are arranged to support the bearing unit and the work piece on the support shaft 16 by recirculating from loaded positions between support shaft 16 and race 20, to unloaded positions above race 20 as shown. As the roller bearing traverses a linear path along the shaft 16, the rollers continuously recirculate between the loaded and unloaded portions via the arcuate recirculation paths defined between inner arcuate guides 30 and 32 and outer arcuate guide walls 34 and 36 of retainer housing half 26 as best shown in FIG. 2. Retainer housing half 28 (not shown in FIG. 2) is similarly configured to provide mating guideways which are opposed to inner guideways 30 and 32, and outer guideways 34, 36 when the retainer housing halves are joined.

Figure 4:
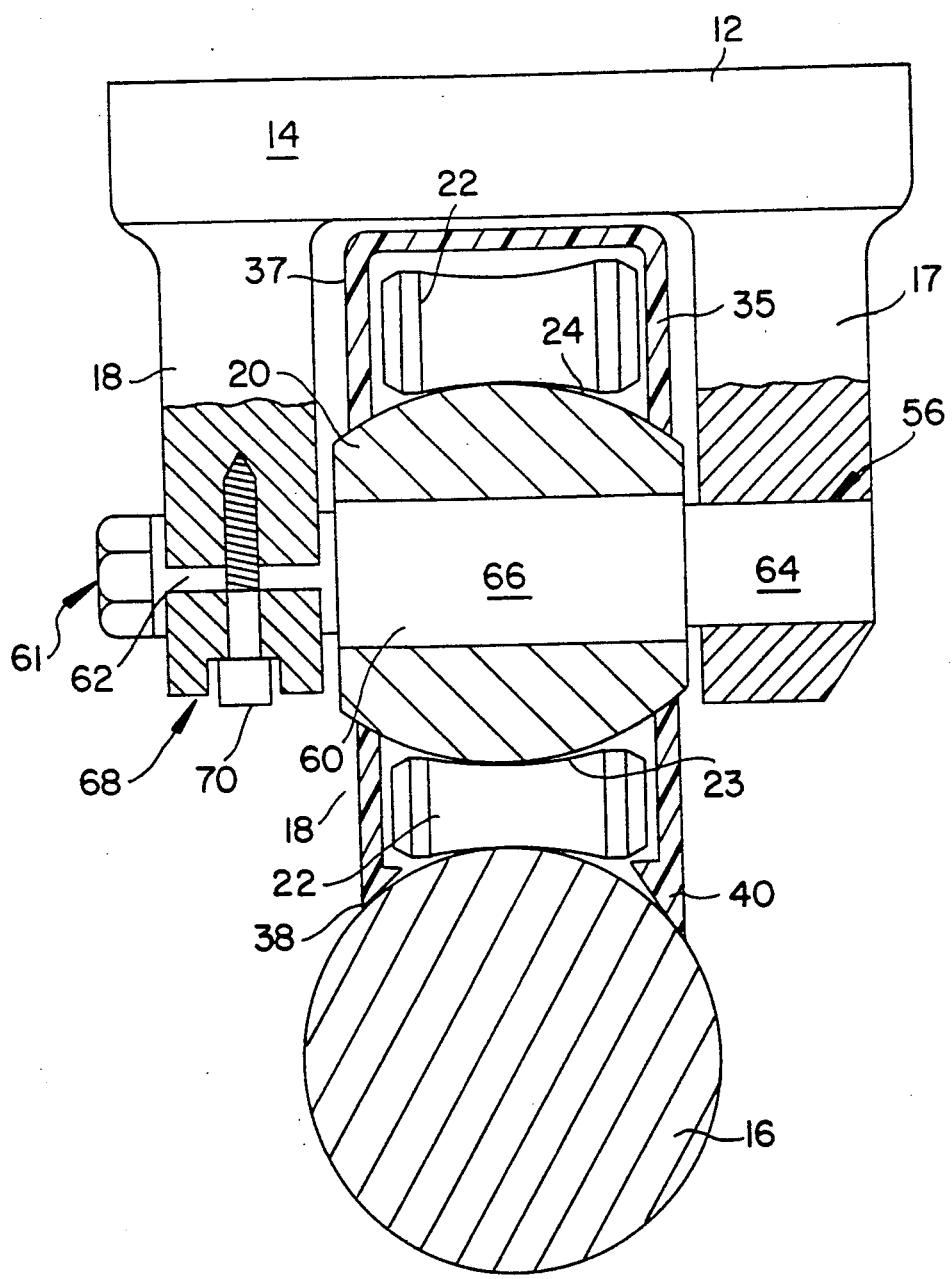
FIG. 4 is a view, partially in cross-section, of the linear roller bearing assembly of FIG. 1 taken along the lines 4—4 of FIG. 3.

Referring now to FIG. 4, a cross-section of the bearing assembly is illustrated. The retainer halves 26, 28 include depending side walls 35, 37 which extend downwardly as shown and include inwardly extending lips 38, 40 to retain the rollers within the housing when assembled. The lips 38, 40 are in light line contact with support shaft 16 to retain lubricating grease and to prevent the introduction of dust or other pollutants into the bearing. At each end portion the assembled housing includes arcuate grease/dust seals 42, 44 shown in FIG. 2, which lightly wipe the arcuate surface of circular shaft 16.

Assembly of the recirculating linear roller bearing is greatly simplified as follows. One retainer housing half 26 is placed on a surface and the race 20 is placed in position as shown in FIGS. 1 and 2. The rollers 22 are then simply placed in position about the race and within the retainer half. During this assembly procedure end grease/dust seals 42, 44 are positioned within their respective slots 46, 48. Thereafter the opposite housing half 28 is assembled in position to retain the rollers 22 and race 20 within the housing and the two halves are retained together by self tapping screws extending through bosses 50, 52 or by adhesives or ultrasonic welding. Alignment pins 51 and corresponding reception bosses 53 are provided.

Referring now to FIGS. 2 and 4 the system for adjusting the height of the roller bearing structure 12 with respect to shaft 16 is illustrated. Race 20 is provided with a transversely extending cylindrical bore 54. In addition depending plates 17, 18 are provided with correspondingly aligned transverse cylindrical bores 56, 58. Adjustment pin 60 extends through plates 17, 18 and race 20 and includes central eccentric section 66 and cylindrical sections 62, 64 at either end. Pin 60 is positioned within the cylindrical openings 56, 58 of depending side walls 17, 18 with eccentric section 66 positioned within cylindrical opening 54 of race 20. Rotation of the Pin 60 utilizing a suitable tool (allen wrench, hex head wrench, etc.) at drive end 61 will cause eccentric section 66 to bear upon inner wall of bore 54 in race 20 causing the race 20 and the entire bearing structure to move up or down, depending upon the relative positions of the eccentric section 66 and the bore 54. A split section 68 shown in FIG. 4 is arranged to clamp the pin 60 in the selected position by tightening fastener 70 with a suitable tool. Thereafter the vertical height of the bearing with respect to shaft 16 is fixed.

Figure 5:
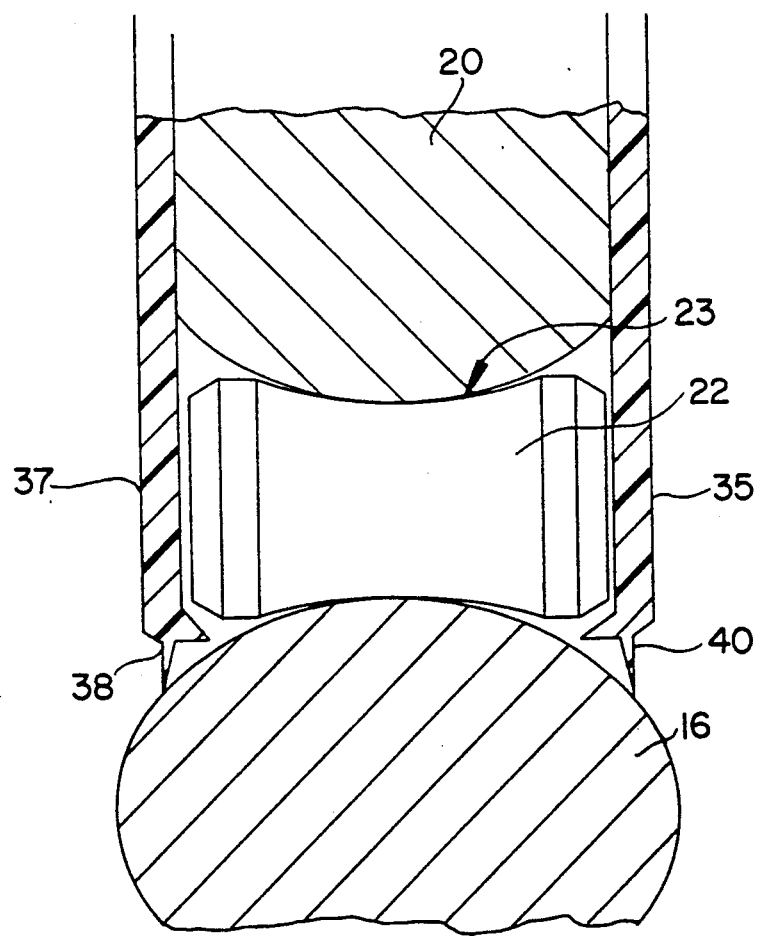
FIG. 5 is a view greatly enlarged, illustrating the relationship between the load bearing shaft and roller unit of the linear bearing assembly of FIG. 1.
Figure 6:
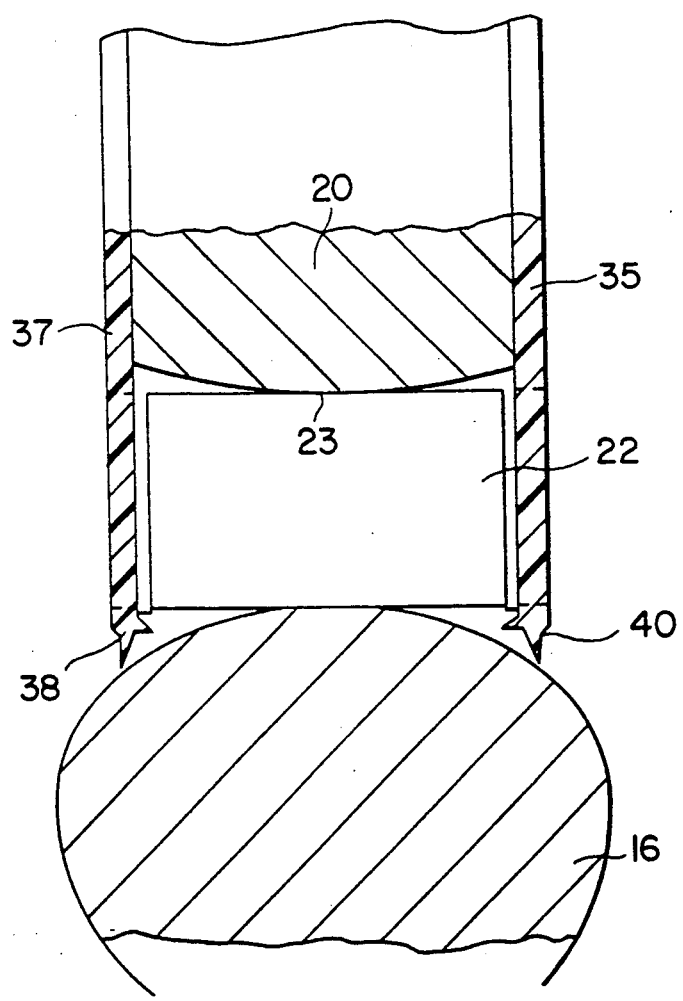
FIG. 6 is a view, greatly enlarged, of an alternative embodiment of the invention utilizing cylindrical rollers.

Referring now to FIGS. 4 and 5, the load bearing surface 23 and return surface 24 of bearing race 20 are convexly shaped to cooperate with the concave shape of the rollers 22 so as to become aligned in free circulating movement of rollers 22 around the bearing race and support shaft 16. By forming the radii of curvature of the rollers 22 slightly larger than the radius of curvature of race 20 (see FIG. 5), the arc of contact between the bearing surface of rollers 22 is more centralized. Rollers 22 can also be cylindrical in form, as shown in FIG. 6, thereby providing a roller unit which is less costly to manufacture.

Figure 7:
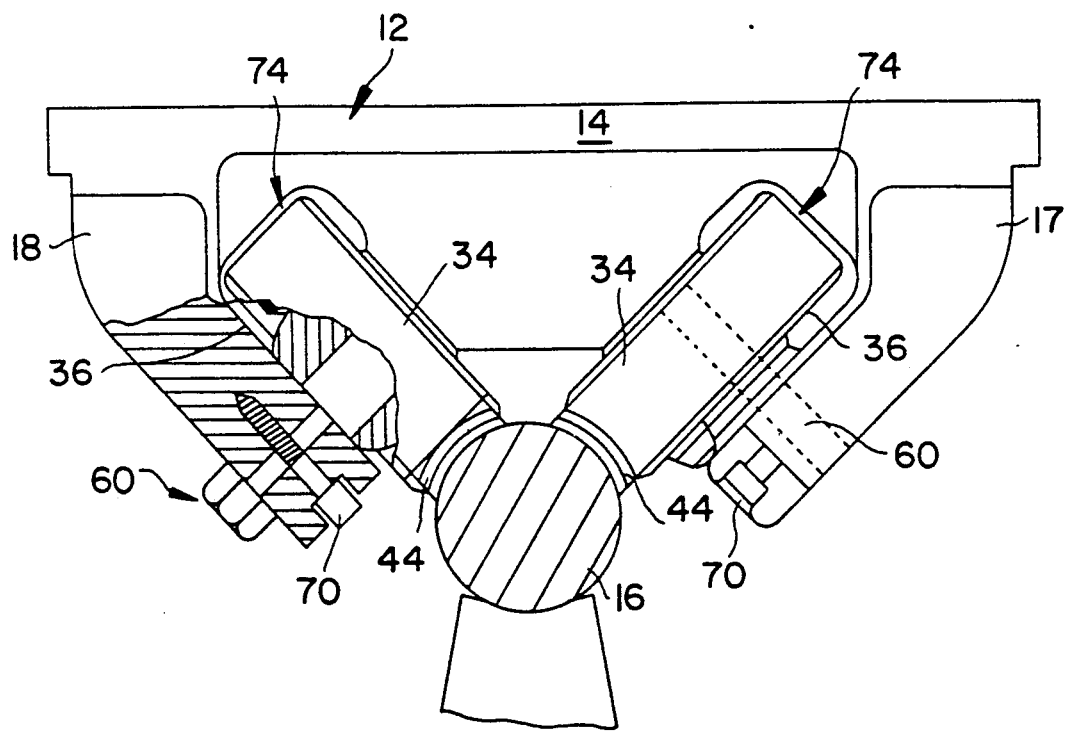
FIG. 7 is a side view of another embodiment of the present invention illustrating the use of two roller-race units.

Referring to FIG. 7, another embodiment of the present invention is illustrated. This embodiment utilizes two race-units, which are positioned so that the rollers 22 of each unit are in bearing contact with the same bearing support shaft. The arrangement shown distributes the working load along two bearing contact areas thereby greatly enhancing the load carrying capacity and providing lateral stability. Each roller-race unit 74 is secured to the mounting member 12 by the same means as employed in the previous embodiment. In this case two eccentric adjustment pins are utilized as shown in FIG. 7.

The linear roller bearing assembly of the present invention has numerous advantages. The enclosed roller-race unit, effectuated by the enveloping feature of the sidewalls, makes it possible to support rollers in the unit without the need for, and the expense associated with, the roller chain assemblies of prior linear bearing units. The assembly of the linear bearing is greatly simplified. As noted, one sidewall may be laid on a surface and a race placed in the correct position. The rollers are then simply placed on the sidewall around the race. The opposite sidewall is then attached to the first retainer via self-tapping screws, ultrasonic welding or adhesives. As noted, in previous assemblies linear bearing units incorporated the manufacture of chains and the boring of highly precise holes in the rollers to receive the chain links. These operations are inherently expensive and require special fixtures and tools. Replacement of bearing components, especially chainlinks are costly maintenance operations. In addition, the rollers are maintained in a stable rolling orientation through the close proximity of the side walls of the bearing retainer housing.

The housing of the bearing structure of the present invention minimizes the migration of contaminants into the bearing assembly due to the contact between the ends of the sidewalls and the round way support shaft 16 and the seals 42, 44 with the round way. This feature reduces corrosive activity in the bearing and removes the need for special seals that are prevalent in conventional bearing assemblies. The provision of an outer housing with prior art chain bearings to retain grease and prevent dust entry to the rollers was expensive to provide in addition to the roller connecting chain. Also, such housings would be bulky.

Furthermore, an embodiment of this invention provides two roller-race units positioned such that each unit is aligned with the same bearing shaft. The working load of the bearing unit is thereby distributed over the roller bearing surfaces of the roller units of each raceway.

What is claimed is:

1. A linear recirculating anti-friction bearing assembly for movably supporting a workpiece on a support shaft which comprises:

a) a housing having a pair of depending roller retainer side walls positioned in spaced relation and defining at least a portion of a recirculating roller path;

b) an elongate roller-race member positioned at least partially within said housing to define with said roller retainer side walls an endless recirculating roller path;

c) a plurality of rollers positioned within said housing for rolling movement between loaded positions and a support shaft and unloaded recirculating positions within said housing; and means to adjust the height of said rollers including a shaft which extends transversely through said roller race member and adapted to move said inner race toward and away from said support shaft.

2. The linear recirculating anti-friction bearing assembly according to claim wherein each of said roller retainer side walls extends generally inwardly at the free end portion to retain said rollers within said housing as said rollers travel between said loaded and unloaded positions.

3. A linear recirculating anti-friction bearing unit for movably supporting a workpiece on support means which comprises:

a) a housing comprised of at least two half sections adapted to be assembled with each other;

b) an inner race member positioned at least partially within said housing for transferring force from said housing to the support means;

c) means within said housing to define with said inner race member, a roller recirculation path;

d) a plurality of rollers positioned and arranged to recirculate between loaded portions between said inner race member and said support means and unloaded positions within said housing and said roller recirculation path;

e) said housing including a pair of depending spaced side walls to retain said rollers within said housing when in said loaded positions between said inner race member and said support means; and f) means to adjust the height of said rollers with respect to the support means.

4. The linear recirculating anti-friction bearing assembly of claim 3 wherein said roller-race member includes load bearing and return surfaces interconnected by end pieces having rounded surfaces.

5. The linear recirculating anti-friction bearing assembly of claim 4 wherein said depending spaced retainer side walls are each inwardly directed at their end portions to retain the rollers therebetween.

6. The linear recirculating anti-friction bearing assembly of claim 5 wherein each end of said retainer side walls is in contact with the bearing support means to limit the passage of foreign pollutants from entering into the bearing assembly and to retain lubricants therein.

7. The linear recirculating anti-friction bearing assembly of claim 6 wherein said retainer side walls are formed from a plastic material.

8. The linear recirculating anti-friction bearing assembly of claim 7 wherein said roller elements have a concave cross-sectional shape.

9. The linear recirculating anti-friction bearing assembly of claim 8 further comprising means to adjust the height of said rollers with respect to the bearing support shaft.

10. The linear recirculating anti-friction bearing assembly of claim 9 wherein said adjusting means is a shaft which extends transversely through said inner rod and includes means for selectively engaging adjusting said inner race member and moving said inner race member in directions toward and away from said support shaft.

11. The linear recirculating anti-friction bearing assembly of claim 10 wherein said adjusting means is an eccentric member which comprises part of said shaft adjusting shaft which is positioned within a concentric opening in said race member, said shaft having concentric end portions mounted concentrically within circular openings of external support members.

12. The linear recirculating anti-friction bearing assembly of claim 3 wherein said roller elements are cylindrical in shape.

13. The linear recirculating anti-friction bearing assembly of claim 12 wherein said adjusting means is a shaft which extends transversely through said inner race member and includes means for selectively engagably adjusting said inner race member and moving said inner race in directions toward and away from said support shaft.

14. The linear recirculating anti-friction bearing assembly of claim 13 wherein said adjusting means is an eccentric member which comprises part of said shaft adjusting shaft which is positioned within a concentric opening in said race, said shaft having concentric end portions mounted concentrically within circular openings of external support members.

15. The linear recirculating anti-friction bearing assembly of claim 3 wherein at least two of said bearing units are connected to support a workpiece on a common round way support shaft.

16. A recirculating anti-friction roller bearing unit for linear motion to be mounted to a member and to bear against a support shaft, the member and the support shaft being relatively linearly movable with respect to each other, said roller bearing unit comprising a housing including a recirculating circuit of concave rollers, a race member having a generally elongate arcuate bearing surface and being rockably mounted within said housing, said roller circuit being endless such that said rollers are movable about said race member to bring said rollers alternately into bearing contact and out of bearing contact between opposing surfaces of said arcuate race member and the support shaft when said unit is mounted to bear against the support shaft, said housing including a pair of half sections, each including a depending side wall such that when said half sections are assembled with each other said side walls are positioned in spaced relation, said side walls further including means to retain said concave rollers therebetween when said concave rollers are positioned in bearing contact with the support shaft such that the load on the bearing unit is distributed over all said rollers in contact with said race member and the support shaft, said concave rollers being free to move circumferentially relative to said race member and to roll longitudinally with respect to said race member so as to permit self alignment of said concave rollers with respect to said race member while said depending side walls guide said concave rollers along said bearing surface of said race member by interaction of said rollers with respect to the support shaft, said bearing unit further comprising eccentric means to adjust the height of said rollers with respect to the support shaft.

* * * * *